B. FRESE.

Roller Abstractor for Watches.

No. 9,467. Reissued Nov. 16, 1880.

Witnesses:

A. Y. Bond.

H. F. Brunn.

Inventor:

Bernard Frese

N. PETERS, PHOTO-LITHOGRAPHER, WASHINGTON, D. C.

UNITED STATES PATENT OFFICE.

BERNARD FRESE, OF CHICAGO, ILLINOIS.

ROLLER-ABSTRACTER FOR WATCHES.

SPECIFICATION forming part of Reissued Letters Patent No. 9,467, dated November 16, 1880.

Original No. 189,307, dated April 10, 1877. Application for reissue filed December 26, 1879.

*To all whom it may concern:*

Be it known that I, BERNARD FRESE, of the city of Chicago, Cook county, State of Illinois, have invented new and useful Improvements in Roller-Abstracters for Watches, of which the following is a full description, reference being had to the accompanying drawings, in which—

Figure 1:
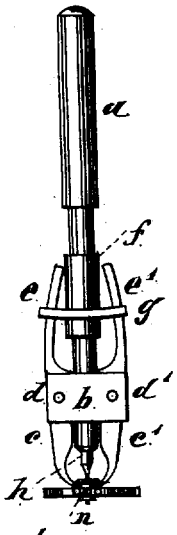
Figure 2:
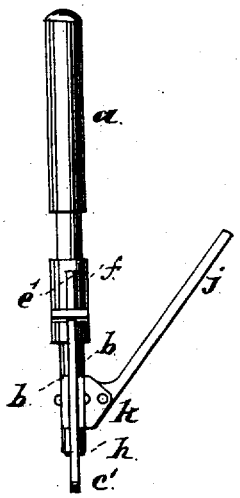
Figure 3:
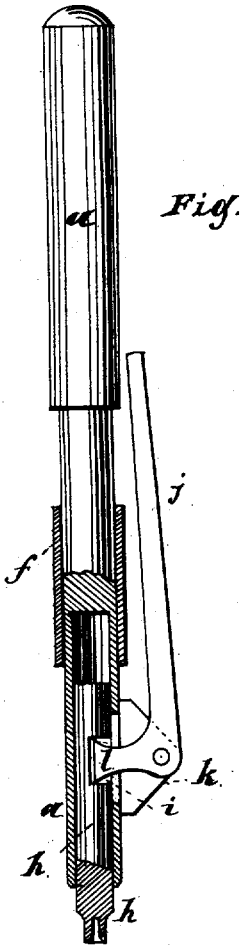
Figure 4:
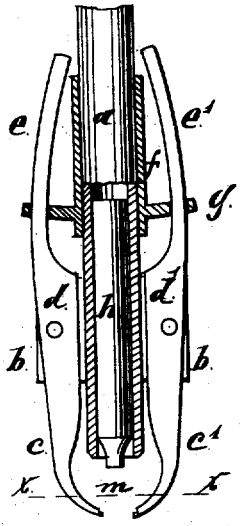
Figure 5:
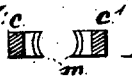
Figure 6:
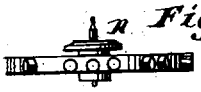

Figure 1 is a front elevation; Fig. 2, a side elevation; Fig. 3, a side view enlarged, some of the parts being shown in section; Fig. 4, a front view enlarged, some of the parts being shown in section; Fig. 5, a section on line *x x* of Fig. 4, looking down. Fig. 6 represents the balance-wheel and roller thereon.

The object of my invention is to provide an instrument by the use of which the roller can be easily removed from the balance-wheel of a watch, and which can be easily operated with one hand, and in the use of which injury to the parts will not be likely to occur.

It consists in two rigid jaws pivoted to a handle and combined with a sliding collar and cross-bar for opening and closing the jaws; in pivoted jaws having extensions and combined with a sliding bar, handle, and spindle; in pivoted jaws having extensions and combined with a sliding bar, sliding spindle, a handle and lever, and in a movable sliding spindle to engage with the staff of the balance-wheel, said spindle being operated by means of a lever.

In the drawings, *a* represents the handle of the instrument.

*b* are two bars permanently secured to the handle near its lower end.

*c c'* are two stiff jaws pivoted at *d d'* to the bars *b*.

*e e'* are rearward-curved extensions from the jaws, each jaw and its extension being formed from a single piece.

*f* is a sliding collar located upon the handle.

*g* is a cross-bar permanently secured to the collar *f*, having holes to receive the parts *e e'*.

*h* is a sliding spindle, located in the lower end of the handle *a*, which is hollow.

*i* is a recess in one side of the spindle *h*.

*j* is a lever pivoted to the ears *k* upon one of the bars *b*.

*l* is the short arm of the lever, which passes through a long slot in the bar on which the ears *k* are located, and also through a similar slot in the hollow portion of the handle, and enters into and engages with the notch or recess *i* in the side of the spindle. The lower end of the spindle *h* is hollow, to engage with the pivot of the balance-staff, and in use the shoulder of the staff comes in contact with the end of the spindle.

*m* is a circular groove in the inside of each jaw, the radius of the circle being the same, or about the same, as that of the roller.

*n* is the roller on the staff of the balance-wheel.

In use the instrument is to be held in one hand, the thumb and forefinger being in the proper position for moving the sliding bar and collar, which should be in the position shown in Fig. 4, the jaws being open. The jaws are then to be placed over the roller, and, by means of the thumb and finger, the sliding bar and collar can be moved up or back, closing the jaws upon the roller, as shown in Fig. 1.

By means of the second finger the lever *j* can be lifted up from the position shown in Fig. 2 to that shown in Fig. 3, bringing the end of the sliding spindle down over the pivot of the balance-staff and forcing the balance away from the roller, the roller being held between the jaws.

The circular groove upon the inside of the jaws insures the proper centering of the instrument, so that the spindle will engage with the pivot of the staff, and, in connection with the stiff jaws, prevents any lateral movement or displacement of the jaws while in use.

It will be seen that during the operation one hand is free to hold the balance, the instrument being wholly operated by the other hand.

I make the handle long, so that in use its upper end will come in contact with the palm of the hand, aiding the operator in steadying the instrument.

I have shown the groove or shoulder *m* as circular—that is the best form; but the instrument would be useful if such groove were not circular.

I do not limit myself to two jaws; three or more might be used. Two are sufficient, especially when the groove is circular.

What I claim as new, and desire to secure by Letters Patent, is as follows:

1. The independently-pivoted jaws *c c'*, having circular grooves in the faces of their turned-in ends, in combination with the extensions *e*, *e'* and cross-bar *g*, for closing the jaws simultaneously and grasping the object uniformly on all sides, substantially as and for the purpose specified.

2. The stiff pivoted jaws *c c'*, having extensions *e e'*, and the sliding bar *g*, in combination with a handle and a spindle, *h*, adapted to be forced over the balance-staff by suitable means, substantially as specified.

3. The combination of the pivoted jaws *c c'*, having extensions *e e'*, sliding bar *g*, spindle *h*, lever *j*, and handle, substantially as and for the purpose specified.

4. In a roller-abstracter having jaws adapted to receive and grasp the roller, a movable sliding spindle to engage with the staff of the balance-wheel, and a lever for operating a spindle, substantially as specified.

BERNARD FRESE.

Witnesses:
O. W. BOND,
H. F. BRUNS.